United States Patent [19]
Okazaki et al.

[11] Patent Number: 5,762,400
[45] Date of Patent: Jun. 9, 1998

[54] SEAT RECLINING MECHANISM

[75] Inventors: Hiroyuki Okazaki, Chiryu; Kenji Ushitani, Tokyo; Katsuji Tokukura, Toyota; Hitoshi Yamamoto, Kyoto, all of Japan

[73] Assignees: Aisin Seiki Kabushiki Kaisha, Kariya; Japan Powder Metallurgy Co., Ltd., Tokyo, both of Japan

[21] Appl. No.: 681,450

[22] Filed: Jul. 23, 1996

[30] Foreign Application Priority Data

Jul. 27, 1995 [JP] Japan ................................ 7-191426
Sep. 26, 1995 [JP] Japan ................................ 7-247778

[51] Int. Cl.[6] .......................................... B60N 2/22
[52] U.S. Cl. ........................... 297/367; 297/378.12
[58] Field of Search ........................ 297/367, 378.12, 297/363, 364, 365

[56] References Cited

U.S. PATENT DOCUMENTS

| | | | |
|---|---|---|---|
| 4,082,352 | 4/1978 | Bales et al. | 297/378.12 X |
| 4,435,013 | 3/1984 | Arihara. | |
| 5,156,439 | 10/1992 | Idlani et al. | 297/367 |
| 5,161,856 | 11/1992 | Nishino | 297/367 |
| 5,547,255 | 8/1996 | Ito et al. | 297/367 |
| 5,553,922 | 9/1996 | Yamada | 297/367 X |
| 5,558,402 | 9/1996 | Yamada | 297/367 X |
| 5,588,705 | 12/1996 | Chang | 297/367 |
| 5,590,931 | 1/1997 | Fourrey et al. | 297/367 X |

FOREIGN PATENT DOCUMENTS 1-169149  11/1989  Japan.
7-136032   5/1995  Japan.

*Primary Examiner*—Peter M. Cuomo
*Assistant Examiner*—Stephen Vu
*Attorney, Agent, or Firm*—Burns, Doane, Swecker & Mathis, LLP

[57] ABSTRACT

A seat reclining mechanism is provided in which engagement of a first engaging portion and a second engaging portion is performed in the vicinity of the center of a pawl in its width direction, without providing a member protruding in the thickness direction of the pawl and without reducing the strength of the pawl. The first engaging portion is an engaging groove which opens toward a side surface of the pawl and extends in a direction intersecting the sliding direction of the pawl at one flat surface side in the thickness direction of the pawl.

10 Claims, 6 Drawing Sheets

SEAT RECLINING MECHANISM

BACKGROUND OF THE INVENTION

The present invention relates to a seat reclining mechanism for adjusting a tilting angle of a seat back for automotive seats.

In order to take a comfortable position of passenger or to permit easy entry, various types of a seat reclining mechanism for adjusting a tilting angle of a seat back for automotive seats have been proposed. One of them is disclosed in the Japanese Patent Laid Open Publication Hei 7-136032 (published on May 30, 1995). Refer to FIG. 6, this prior reclining mechanism has ratchets 100, 100 formed in an upper arm secured to a seat back frame, pawls 101, 101 slidably supported on a lower arm secured to a seat cushion frame, which engage with and disengage from the ratchets by way of its sliding motion in a radial direction, and a release member or cam member 103 rotatably supported on a rotatable shaft 104 passing through both the arms.

In this case, the rotation of the shaft 104 causes the cam member 103 to be turned in one direction and arms 105, 105 of the cam member 103 to be inserted into grooves or recesses 106, 106, respectively so that the pawls 101, 101 are slid radially inwardly and teeth formed on the pawls 101, 101 are disengaged from the ratchets 100, 100. Thus, the seat back can be tilted forwardly or rearwardly with respect to the seat cushion. In this prior art mechanism, a first engaging portion is defined by engaging notches 106, 106 formed so as to be opened toward side surfaces of the pawls 101, 101 and extending in a direction intersecting the sliding direction of the pawls 101, 101. It should be noted that the notches 106, 106 are formed to be opened toward both the flat surfaces and one side surface of the pawls 101, 101, respectively. Thus, in considering the strength of each pawl 101, it is difficult to enlarge the extension length of each first engaging portion (notch) which intersects the sliding direction of each pawl, and as a result, in consideration of the sliding amount of each pawl with respect to the ratchet, engagement of the notch (first engaging portion) and the arm (a second engaging portion) is inevitably displaced from the vicinity of the center in the width direction of the pawl 101, i.e. it starts from a position in the vicinity of the side surface of the pawl. Due to this, when the pawl is slid, looseness occurs with respect to the sliding direction of the pawl and the power which slides the pawl decreases when the first engaging portion and the second engaging portion are engaged, and as a result there is the possibility that the operating feeling of the release member deteriorates.

The other aspects of the seat reclining mechanisms are disclosed, for example, in the Japanese Utility Model Laid Open Publication Hei 1-169149 (published on Nov. 29, 1989) and U.S. Pat. No. 4,435,013.

SUMMARY OF THE INVENTION

The present invention therefore has as its object to provide a seat reclining mechanism in which engagement of a first engaging portion and a second engaging portion is performed in the vicinity of the center of a pawl in its width direction, without providing a member protruding in the thickness direction of the pawl and reducing the strength of the pawl.

The technical means conceived in the present invention for solving the above technical problems is to make an engaging groove on each pawl which opens toward one side surface of the pawl and one flat surface side in the thickness direction of the pawl.

According to the present invention, there is provided a seat reclining mechanism for vehicles comprising; an upper arm secured to a seat back frame; a lower arm secured to a seat cushion frame; a rotatable shaft for rotatably supporting the upper arm with respect to the lower arm and having a handle for rotation thereof; a cam member disposed in a space defined between both the arms and secured to the rotatable shaft; and at least one pawl disposed in the space and radially slidable in response to a rotation of the cam member; the pawl having teeth formed on an outer surface thereof and engageable with a ratchet formed on one of both the arms, a cam surface formed on an inner surface thereof, and an engaging groove formed on a flat surface thereof to be opened toward one of side surfaces and extending in the direction intersecting with the direction of the sliding movement of the pawl, further the cam member having at least one projection abutted on the cam surface of the pawl and at least one arm extending to be inserted into the engaging groove.

Preferably, the space is defined by a concave portion of the upper arm and a concave portion of the lower arm which has a circular central portion and at least one pawl receiving portion in a rectangular form and extending radially outwardly from the central portion, the pawl receiving portion having opposed side wall surfaces in slidable relation with the side surfaces of the pawl.

According to these technical means, engagement of the groove of the pawl and the arm of the cam member can be performed in the vicinity of the center in the width direction of the pawl, without providing a member protruding in the thickness direction of the pawl and reducing the strength of the pawl.

According to the present invention, the above technical problems can be solved and thereby the operational feeling of the release member can be improved.

BRIEF DESCRIPTION OF THE DRAWINGS

These and other features, aspects and advantages of the present invention will be better understood with reference to the following description, appended claims and accompanying drawings, wherein:

DETAILED DESCRIPTION OF THE INVENTION

Figure 1:
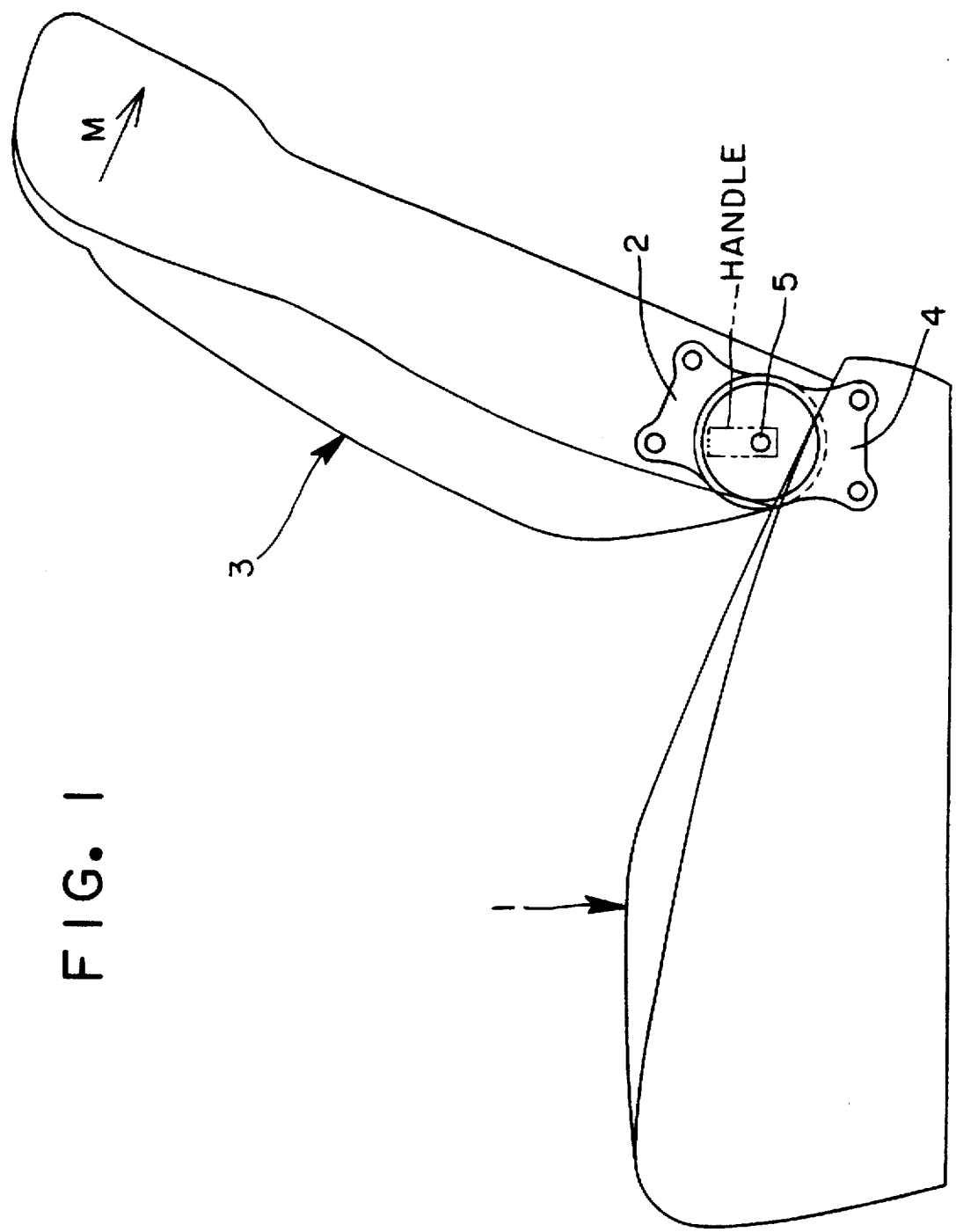
FIG. 1 is a side view of a seat on which the seat reclining mechanism of the present invention is mounted.
Figure 2:
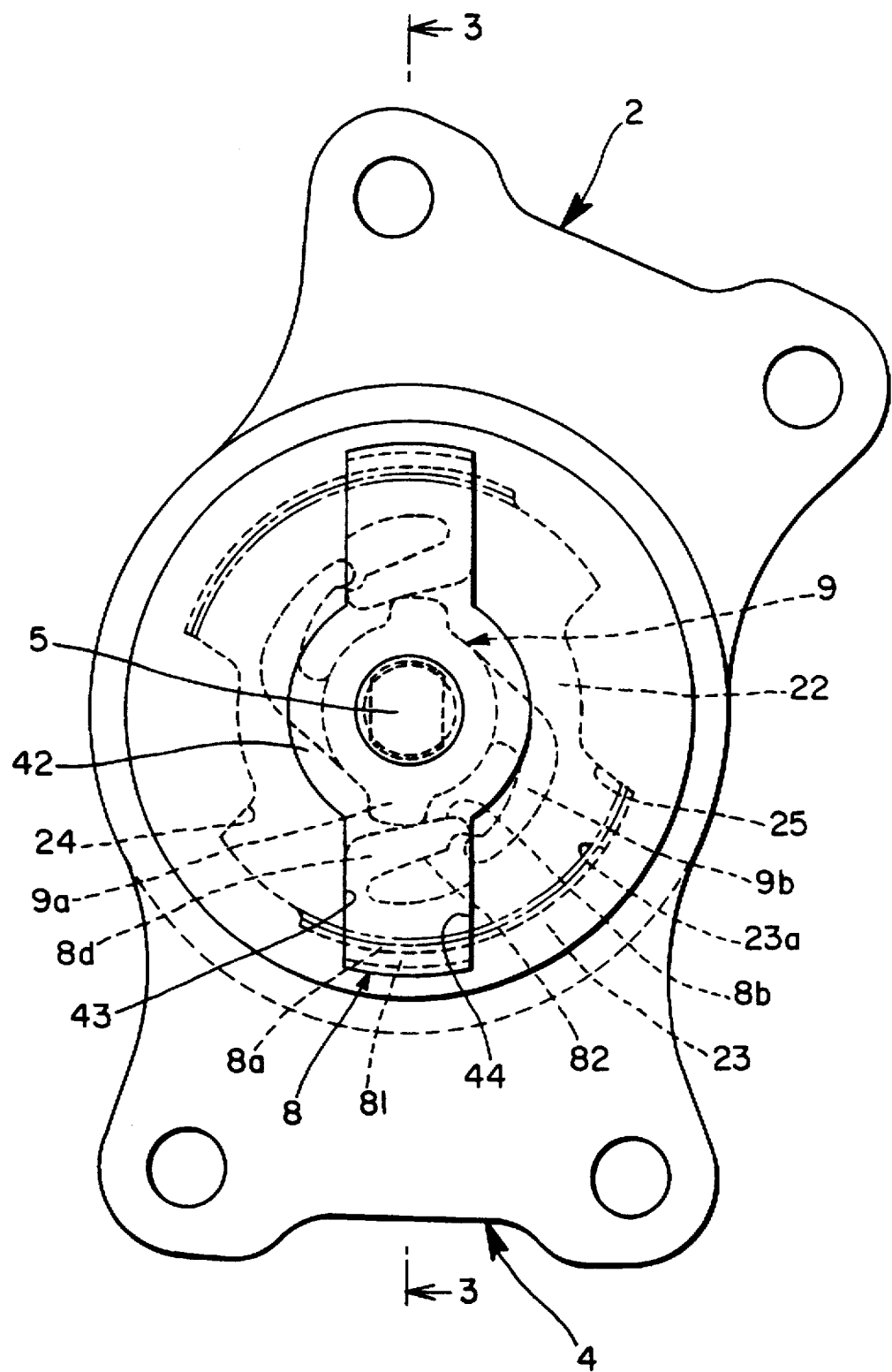
FIG. 2 is a plan view of the seat reclining mechanism of the present invention.
Figure 3:
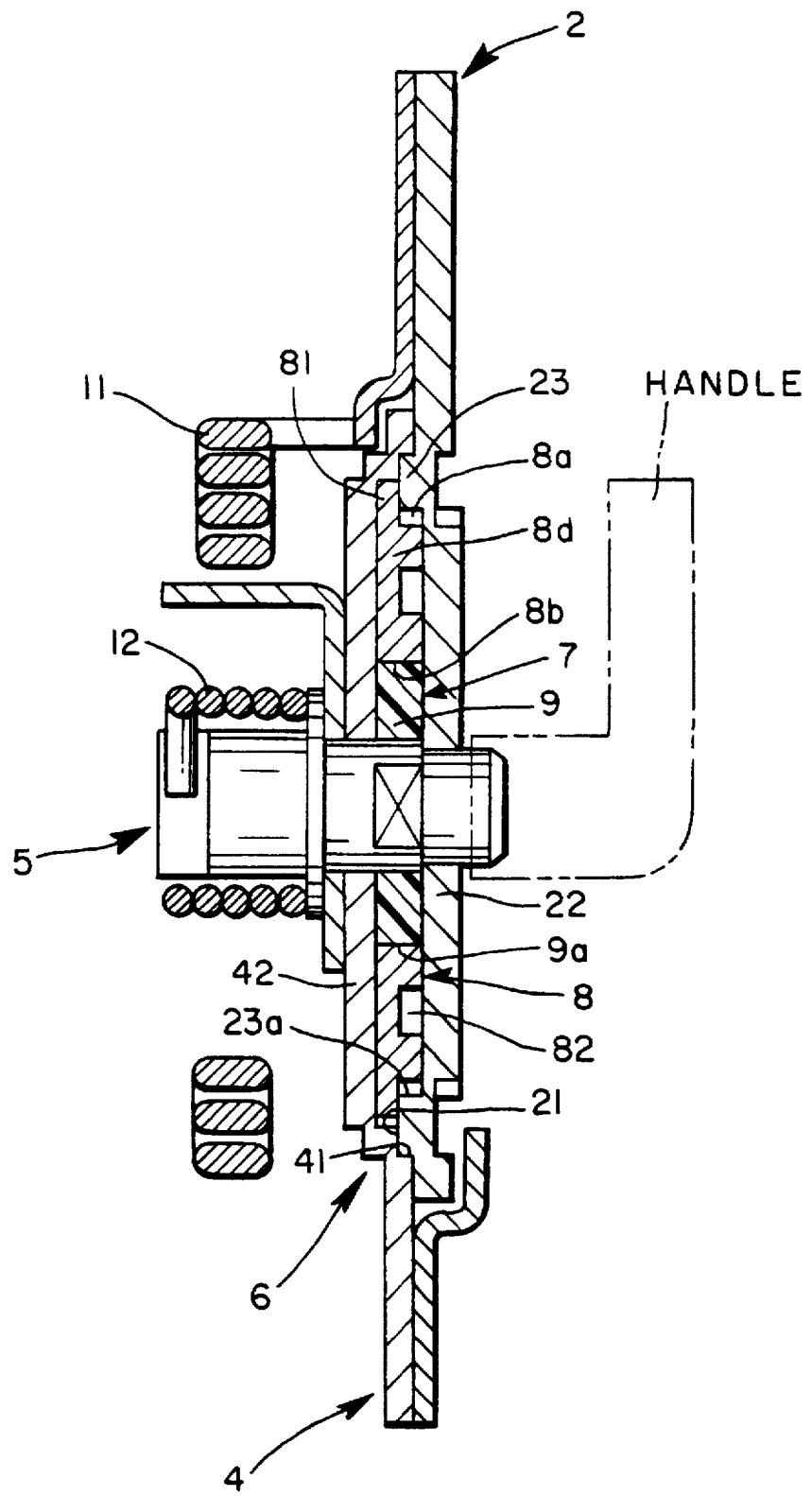
FIG. 3 is a cross section across the line 3—3 of FIG. 2.

As shown in FIG. 2 and FIG. 3, a lower arm 4 is fixed to a seat cushion 1 (shown in FIG. 1) and an upper arm 2 is fixed to a seat back 3 (shown in FIG. 1). A rotatable shaft 5 is rotatably supported on both the arms 4 and 2, but in a form passing through both the arms 4 and 2. The upper arm 2 is rotatable with respect to the lower arm 4 via a guide mechanism 6 surrounding the rotatable shaft 5. Note that the guide mechanism 6 for guiding the tilt of the upper arm 2 with respect to the lower arm 4 is formed by interlocking a protruding or convex portion 21 formed by half blanking in the upper arm 2 and an corresponding concave portion 41 formed in the lower arm 4.

At the location where the rotatable shaft 5 passes through the lower arm 4 and upper arm 2, rotatable shaft support portions 42 and 22 in the shape of a recess are formed to form a space 7 between the lower arm 4 and the upper arm 2. Also, by forming these rotatable shaft support portions 42 and 22, a ratchet 23 is formed in the upper arm 2 to be exposed to the space 7 and a pair of guide walls 43 and 44 are formed in the lower arm 4 to be exposed to the space 7 and disposed between the ratchet 23 and the rotatable shaft 5. This ratchet 23 has an arc-shaped gear portion 23a and the pair of opposed guide walls 43 and 44 extend in parallel in the radial direction. Further, a pair of stopper walls 24 and 25 are formed in the upper arm 2 by the formation of the rotation shaft support portion 22.

Pawls 8 and a cam member 9 are disposed in the space 7. Each pawl 8 has a main body portion 8d having a rectangular shape and is disposed between the guide walls 43 and 44 of the lower arm 4 so as to be slidable along the guide walls 43 and 44 in the radial direction of the rotation shaft 5 so that they contact the guide walls 43 and 44 with a predetermined gap therebetween. The main body portion includes opposite side surfaces 81a, 81a. A teeth portion 8a is formed on the surface of the main body portion 8b of the pawl 8 to face the gear portion 23a of the ratchet 23. Thus, it is engageable with and disengageable from the gear portion 23a of the ratchet 23 of the upper arm 2 in response to the sliding motion of the pawl 8. Also, a cam surface 8b having a cam shape is formed on a surface opposite to the surface formed with the gear portion 8a of the main body portion 8d of the pawl 8. The cam member 9 is supported by the rotatable shaft 5 so as to rotate integrally therewith. On the portion of the cam member 9 facing the cam surface 8b of the pawl 8, a protruding portion 9a is formed, contacting and separating from the cam surface 8b of the pawl 8 by a rotating motion of the cam member 9. The pawl 8 is slidably operated by contact between the cam surface 8b of the pawl 8 and the protruding portion 9a of the cam 9, engaging and disengaging of the gear portion 8a of the pawl 8 and gear portion 23a of the ratchet 23 are performed.

Figure 4:
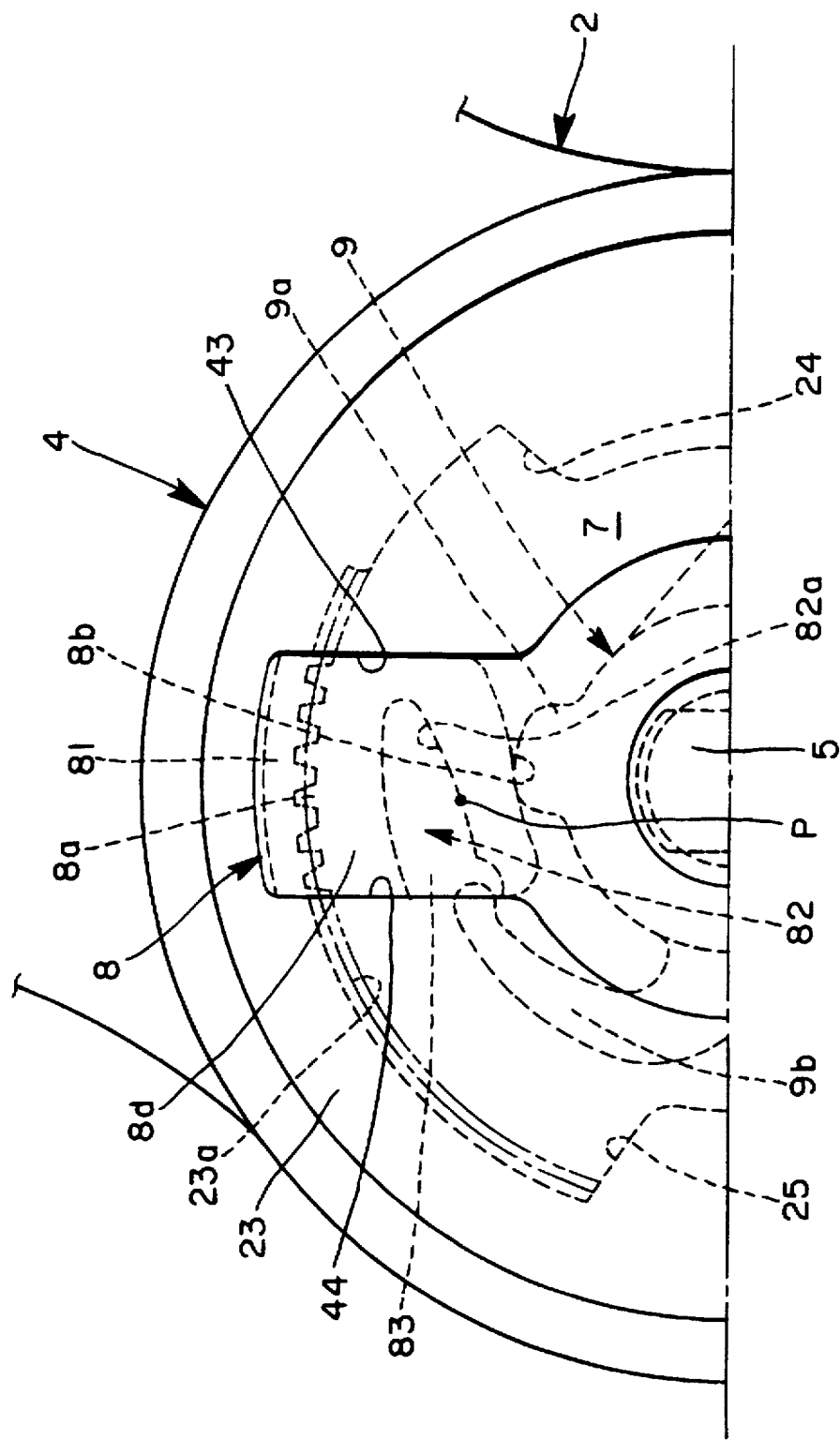
FIG. 4 is an enlarged view corresponding to the upper half of FIG. 2 showing the pawl of the seat reclining mechanism of the present invention.
Figure 5:
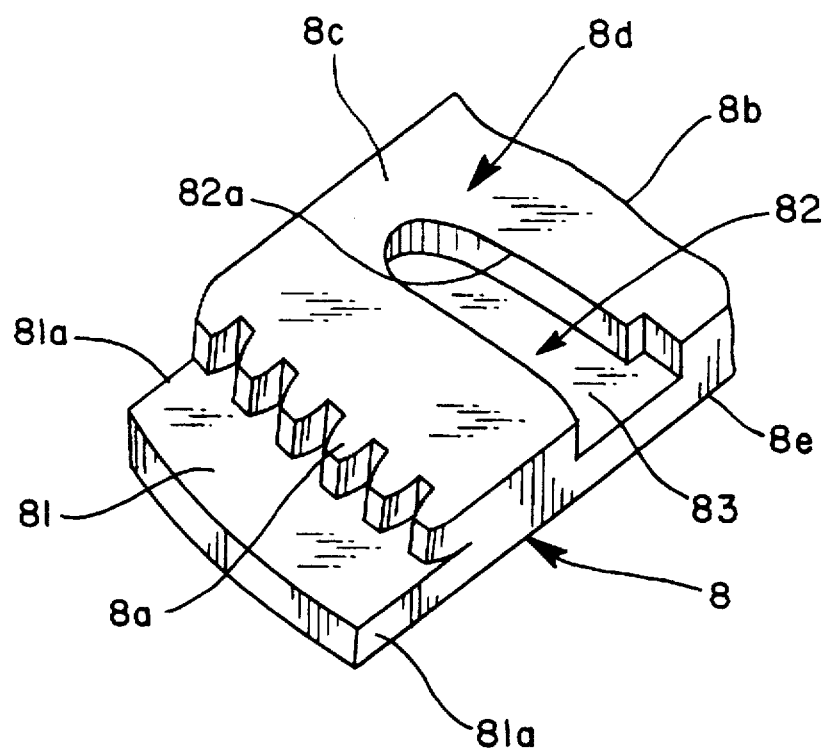
FIG. 5 is a perspective view the pawl of the seat reclining mechanism of the present invention.
Figure 6:
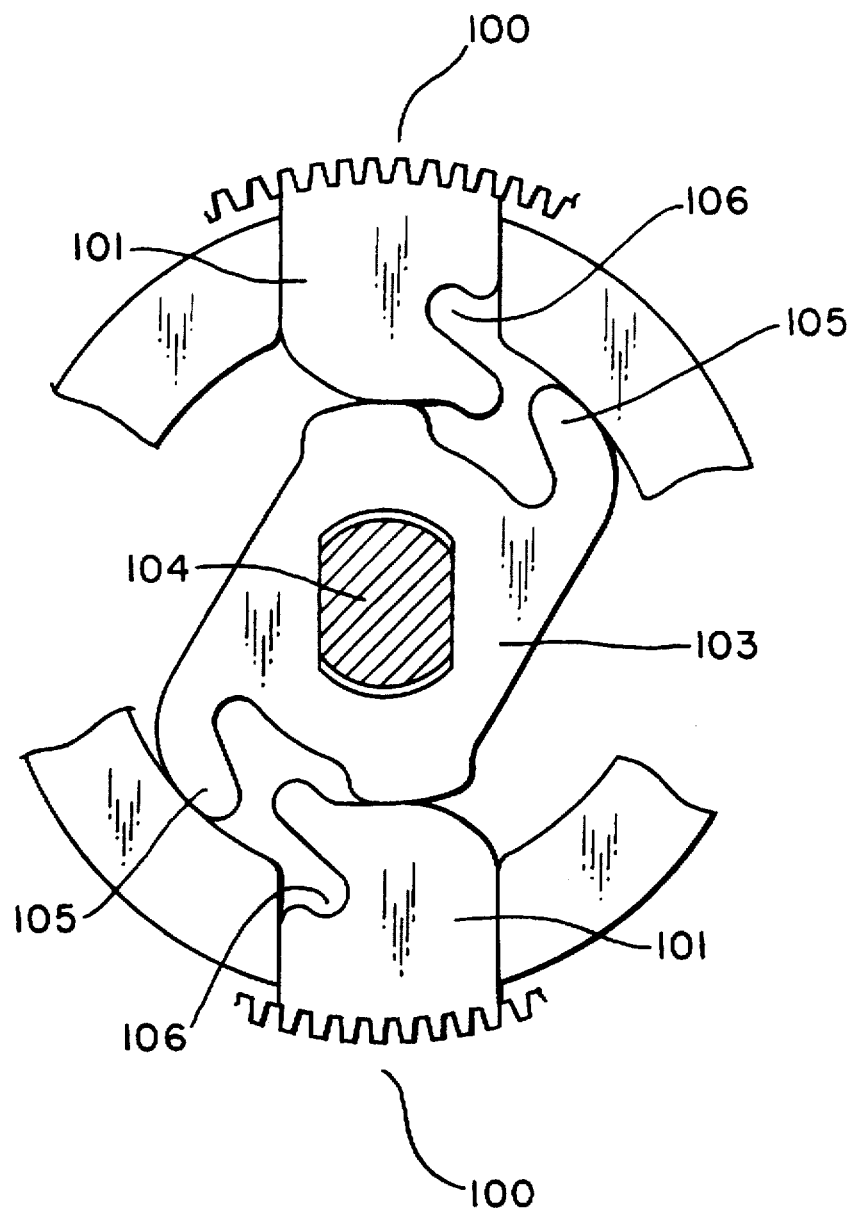
FIG. 6 is a partial view of a prior reclining mechanism.

As shown in FIG. 3 and FIG. 4, the rotation shaft support portion 42 of the lower arm 4 is constructed such that the guide walls 43 and 44 intersect the gear portion 23a of the ratchet 23 of the upper arm 2 and the space 7 exists up to a location facing a protruding portion 21 of the upper arm 2 which forms the guide mechanism 6. As shown in FIGS. 3 through 5, the gear portion 8a of a pawl 8 is formed on the half of the thickness of the pawl 8, and a wall portion 81 is formed in the remaining half of the thickness. This wall portion 81 extends from a main body portion 8d such that it protrudes further beyond the gear portion 8a. The gear portion 8a of the pawl 8 and the gear portion 23a of the ratchet 23 are engageable.

As is shown in FIG. 3 and FIG. 4, in the main body portion 8d of the pawl 8, engaging groove 82 which is cam-shaped in the diametric direction is formed. At least one engaging arm 9b which is engageable with the engaging groove 82 extends in the peripheral direction, and the engaging groove 82 and the engaging arm 9b are engaged by the rotating operation of the cam member 9, and by this engagement the pawl 8 is slidably operated to release the engagement of the gear portion 8a of the pawl 8 and gear or teeth portion 23a of the ratchet 23. As shown in FIGS. 3 through 5, the engaging groove 82 is constructed such that it extends in a direction intersecting the sliding direction of the pawl 8 at approximately half of the thickness of the main body portion 8d in one surface 8c of the main body portion 8d, and opens toward one of the side surfaces 81a of the main body portion 8d. This engaging groove 82 has enough width so that the engaging arm 9b is able to intrude thereinto, and the vertical surface thereof serves as an engaging surface 82a having a cam shape engageable with the engaging arm 9b. This engaging surface 82a is set such that it begins to engage with the engaging arm 9b in the vicinity of the center in the width direction of the pawl 8. Also, in another surface 8e in the thickness direction of the main body portion 8d a wall portion 83 which serves as a wall for the engaging groove 82 is formed.

The ratchet 23, the pair of pawls 8, guide walls 43 and 44, and protruding portion 9a of the cam member 9 are disposed as one unit.

Note that a spring 11 which rotatably urges the upper arm 2 in a counterclockwise direction (in FIG. 1) with respect to the lower arm 4 is provided around the rotatable shaft 5 as shown in FIG. 1 and when a handle (in FIG. 3) is rotated manually the seat back 3 can fall forward with respect to the seat cushion 1. Also, a spring 12 which rotatably urges the rotation shaft 5 in a counterclockwise direction (in FIG. 2) with respect to the lower arm 4 is provided around the rotatable shaft 5 as shown in FIG. 3. By the urging force of the spring 12 the protruding portion 9a normally contacts the cam surface 8b of the pawl 8 and the engagement of the gear portion 23a of the ratchet 23 and the gear portion 8a of the pawl 8 is maintained.

Next, the operation of the present invention will be explained.

In FIG. 2, a set of pawls 8 is pushed radially outwardly by the contact of the cam surface 8b of the pawl 8 and the protruding portion 9a of the cam 9 and engagement of the gear portion 23a of the ratchet 23 and the gear portion 8a of the pawl 8 is performed, whereby the tilt of the upper arm 2 is restricted with respect to the lower arm 4.

In this state, by the rotating operation of the handle (in FIG. 3) against the urging force of the spring 12, the cam 9 also rotates in the clockwise direction of FIG. 2 together with the rotatable shaft 5, and by means of the rotation of the cam 9 the contact between the protruding portion 9a and the cam surface 8b is released and the engaging arms 9b intrude into the engaging groove 82, beginning to engage with the engaging surface 82a of the engaging groove 82 at an engaging point P (shown in FIG. 4) in the vicinity of the center in the width direction of each pawl 8, each pawl 8 being slid toward the rotatable shaft 5. Thereby, engagement between the teeth portion 8a of the pawl 8 and the gear portion 23a of the ratchet 23 is released, and the upper arm 2 becomes rotatable with respect to the lower arm 4. After the upper arm 2 is tilted against the urging force of the spring 11 to a desired position with respect to the lower arm 4, the rotation operation of the handle is released, whereupon the rotatable shaft 5 is rotated in the opposite direction to that described above by receiving the urging force of the spring 12, the pawl 8 is slid toward the ratchet 23, and as a result the gear portion 8a of the pawl 8 and the gear portion 23a of the ratchet 23 are re-engaged and rotation of the upper arm 2 with respect to the lower arm 4 is restricted. As a result, adjustment of the angle of inclination of the seat back 3 with respect to the seat cushion 1 is performed.

As many apparently widely different embodiments of the present invention can be made without departing from the spirit and scope thereof, it is to be understood that the invention is not limited to the specific embodiments thereof except as defined in the appended claims.

What is claimed is:

1. A seat reclining mechanism for vehicles comprising:
   an upper arm adapted to be secured to a seat back frame;
   a lower arm adapted to be secured to a seat cushion frame;
   a rotatable shaft for rotatably supporting the upper arm with respect to the lower arm with a space being defined between the upper arm and the lower arm, said rotatable shaft having a handle for rotation with the shaft;
   a cam member disposed in the space defined between the upper and lower arms, said cam member being secured to the rotatable shaft; and
   at least one pawl disposed in said space which is slidable in a radial direction with respect to the shaft in response to rotation of the cam member, the pawl having an inner surface which faces radially inwardly with respect to the shaft, an oppositely facing outer surface and oppositely positioned side surfaces extending between the inner and outer surfaces, the pawl having teeth formed on the outer surface of the pawl for engagement with a ratchet formed on one of the upper and lower arms, a cam surface formed on the inner surface of the pawl, and an engaging groove formed in the pawl, the engaging groove opening toward one of the side surfaces of the pawl and extending in a direction intersecting the direction of sliding movement of the pawl, the engaging groove being defined in part by a wall portion lying in a plane that intersects the shaft, the cam member having at least one projection abutting the cam surface of the pawl and at least one arm extending for insertion into the engaging groove;
   the space being defined by a concave portion of the upper arm and a concave portion of the lower arm which has a circular central portion and at least one pawl receiving portion in a rectangular form and extending radially from the central portion, the pawl receiving portion having opposed side wall surfaces in slidable relation with the side surfaces of the pawl;
   the concave portion of the upper arm having opposed side wall surfaces to restrict a tilting angle of the upper arm relative to the lower arm by abutting one of the side wall surfaces of the pawl upon one of the side wall surfaces of the concave portion of the upper arm;
   the thickness of the pawl being sized so that the pawl extends partially toward the concave portion of the upper arm;
   the engaging groove being provided at its central portion with an engaging side surface engageable with a part of the arm of the cam member; and
   the pawl has a radially extending portion that extends radially outwardly with respect to the shaft beyond the teeth portion, and the pawl receiving portion has a part for accommodating the radially extending portion.

2. A seat reclining mechanism according to claim 1, wherein the engaging groove is provided at its central portion with an engaging side surface engageable with the arm of the cam member.

3. A seat reclining mechanism according to claim 1, wherein the ratchet is formed on a circumferential wall of the concave portion of the upper arm.

4. A seat reclining mechanism according to claim 3, wherein the rotatable shaft is subjected to a biasing force of a spring to establish engagement of the teeth of the pawl and the ratchet of the upper arm.

5. A seat reclining mechanism for vehicles comprising:
   an upper arm adapted to be secured to a seat back frame;
   a lower arm adapted to be secured to a seat cushion frame;
   a rotatable shaft rotatably supporting the upper arm with respect to the lower arm;
   a handle extending from the shaft;
   a cam member connected to the shaft and disposed between the upper arm and the lower arm; and
   at least one pawl which is slidable in a radial direction with respect to the shaft, said pawl being disposed between the upper arm and the lower arm, the pawl having an inner surface which faces radially inwardly with respect to the shaft and an oppositely facing outer surface, the pawl having teeth formed on the outer surface of the pawl for engagement with a ratchet formed on one of the upper and lower arms, a cam surface formed on the inner surface of the pawl, and an engaging groove formed in the pawl and extending in a direction intersecting the direction of sliding movement of the pawl, the engaging groove being defined in part by a wall portion having a thickness less than the thickness of a portion of the pawl surrounding the engaging groove, the cam member having at least one projection abutting the cam surface of the pawl and at least one arm extending for insertion into the engaging groove.

6. A seat reclining mechanism according to claim 5, wherein the teeth on the pawl terminate in a free end, a portion of the pawl extending beyond the free end of the teeth.

7. A seat reclining mechanism according to claim 5, including a space defined between the upper arm and the lower arm, the pawl and the cam member being disposed in the space.

8. A seat reclining mechanism for vehicles comprising:
   an upper arm adapted to be secured to a seat back frame;
   a lower arm adapted to be secured to a seat cushion frame;
   a cam member connected to the shaft and disposed between the upper arm and the lower arm; and
   at least one pawl which is slidable in a radial direction with respect to the shaft, said pawl being disposed between the upper arm and the lower arm, the pawl having an inner surface which faces radially inwardly with respect to the shaft and an oppositely facing outer surface, the pawl having teeth formed on the outer surface of the pawl for engagement with a ratchet formed on one of the upper and lower arms, a cam surface formed on the inner surface of the pawl, and an engaging groove formed in the pawl and extending in a direction intersecting the direction of sliding movement of the pawl, the engaging groove being defined in part by a wall portion having a thickness less than the thickness of a portion of the pawl surrounding the engaging groove, the cam member having at least one projection abutting the cam surface of the pawl and at least one arm extending for insertion into the engaging groove, the pawl including opposite side surfaces extending between the inner surface and the outer surface, said engaging groove opening towards one of the side surfaces of the pawl.

9. A seat reclining mechanism according to claim 8, wherein the teeth on the pawl terminate in a free end, a portion of the pawl extending beyond the free end of the teeth.

10. A seat reclining mechanism according to claim 8, including a space defined between the upper arm and the lower arm, the pawl and the cam member being disposed in the space.

* * * * *